United States Patent
Delaplace et al.

(10) Patent No.: US 7,382,283 B2
(45) Date of Patent: *Jun. 3, 2008

(54) METHOD AND DEVICE FOR DETECTING AN OVERSTEPPING OF DESIGN LOADS OF THE TAILPLANE OF AN AIRCRAFT

(75) Inventors: Franck Delaplace, Toulouse (FR); Sylvie Marquier, Toulouse (FR); Gérard Mathieu, Pibrac (FR); Gennaro Squeglia, Colomiers (FR)

(73) Assignee: Airbus France, Toulouse (FR)

( * ) Notice: Subject to any disclaimer, the term of this patent is extended or adjusted under 35 U.S.C. 154(b) by 242 days.

This patent is subject to a terminal disclaimer.

(21) Appl. No.: 11/146,105

(22) Filed: Jun. 7, 2005

(65) Prior Publication Data

US 2008/0097728 A1 Apr. 24, 2008

(30) Foreign Application Priority Data

Jun. 15, 2004 (FR) .................................. 04 06455

(51) Int. Cl.
*G08B 21/00* (2006.01)
(52) U.S. Cl. ...................... 340/945; 340/963; 340/971; 701/3; 701/9; 701/14; 702/42; 244/9
(58) Field of Classification Search ................... None
See application file for complete search history.

(56) References Cited

U.S. PATENT DOCUMENTS 4,302,745 A 11/1981 Johnston et al.
5,359,326 A 10/1994 Bivens et al.

FOREIGN PATENT DOCUMENTS

GB 2192723 1/1988

*Primary Examiner*—Julie Lieu
(74) *Attorney, Agent, or Firm*—Dickinson Wright, PLLC

(57) ABSTRACT

Detection of the overstepping of design loads of an aircraft tailplane may include determining current bending and twisting moments applied to the aircraft. The determined bending and twisting moments are compared with a safety envelope to determine the risk of developing permanent deformations on the tailplane. A determination is made as to whether a structural inspection of the tailplane should be performed based on the comparison result.

14 Claims, 1 Drawing Sheet

METHOD AND DEVICE FOR DETECTING AN OVERSTEPPING OF DESIGN LOADS OF THE TAILPLANE OF AN AIRCRAFT

FIELD OF THE INVENTION

The present invention relates to a method and device for detecting an overstepping of design loads of the tailplane of an aircraft.

BACKGROUND OF THE RELATED ART

The expression design loads is understood to mean, within the context of the present invention, the maximum loads that can be supported by the structural parts taken into account (namely the tailplane) without permanent deformations appearing.

With the obvious aim of safety, an inspection of the tailplane of the aircraft, as well as the repair of any flaws, have to be performed as soon as said design loads are overstepped.

An inspection of structural parts of the aircraft is generally triggered following the generation by an incident detection computer, for example of the FWC ("Flight Warning Computer") type, of a speed overshoot alarm (also known as an "overspeed warning").

In general, such an alarm is tripped when an overshoot of more than four knots of a permitted maximum speed (Mach number) dependent on the current configuration of the aircraft, is detected.

The various maximum speeds (Mach numbers) are determined by virtue of load models specific to each zone of the aircraft, in such a way that the constituent elements of the aircraft do not undergo any structural load of such a kind as to damage them.

Such an overshoot of maximum speed (Mach number) may occur upon unusual maneuvers, upon encountering significant turbulence or upon erroneous actions on the part of the pilot.

The activation of this alarm compels the airline, in accordance with the maintenance manual, to perform a maintenance check of the aircraft. This operation is aimed at verifying the ability of the structure of the aircraft to properly withstand the loads encountered during the speed excursion (Mach number) beyond the flight domain.

This check consists in visually ascertaining that cracks/fissures have not developed and/or that structural elements or ties are not deformed and in verifying that the various systems potentially affected are still operating normally.

Such maintenance checks therefore keep the aircraft grounded, which of course penalizes the airline.

Moreover, statistical information originating from airlines points to a relatively significant frequency of occurrence of speed overshoot. In fact, for more round trips, airlines often ask their pilots to fly at speeds close to the maximum speeds. In consequence, a simple gust of wind or turbulence triggers the alarm, thereby compelling the airline to perform the maintenance check as described in the aircraft's maintenance manual.

Now, it is apparent that, in a very large majority of cases, no damage at the level of the structure of the aircraft of crack, fissure, etc. type has been observed. Thus, it is apparent that the criterion compelling or otherwise the carrying out of a maintenance check following a speed overshoot alarm of the aforesaid type, is excessive and unsuited to the requirement.

SUMMARY OF THE INVENTION

An object of the present invention is to remedy these drawbacks.

It relates to a method for detecting on an aircraft, in a particularly effective and reliable manner, any overstepping of design loads of the tailplane of said aircraft, while avoiding inspections of said tailplane that are not visibly justified from a technical point of view.

For this purpose, according to the invention, said method is noteworthy in that:

A/ in a preliminary step, a first safety envelope is determined representing a chart formed in a plane on the basis of pairs of values of bending moment and of twisting moment of the tailplane and defined so that, for any pair of such values which lies outside said first safety envelope and which is applied to the aircraft, there exists a risk of appearance of permanent deformations on the tailplane;

B/ in the course of a flight of the aircraft, the following steps are carried out repetitively and automatically:
   a) the current bending moment is estimated;
   b) the current twisting moment is estimated;
   c) a first comparison is carried out by comparing the pair formed by said current bending moment and said current twisting moment with said first safety envelope; and
   d) one determines whether a structural inspection of said tailplane has to be performed, at least on the basis of the result of said first comparison.

A structural inspection has to be implemented when a pair of current bending and twisting moments lies outside said first safety envelope.

Thus, by virtue of the simultaneous monitoring of the bending moment and of the twisting moment of the tailplane, by way of said first safety envelope, a refined evaluation of the load level to which said tailplane has been subjected is obtained. This makes it possible to significantly reduce the number of inspections (or maintenance checks) to be triggered relating to said tailplane and hence the drawbacks stemming therefrom.

Moreover, by virtue of the taking into account of said first safety envelope:

the monitoring is particularly effective and simplified, since said first safety envelope is formed on the ground before the flight; and the evaluation of a possible overstepping of loads is very refined, since one does not in general simply take into account a single maximum value for the bending moment and a single maximum value for the twisting moment, but a high number of pairs of bending moment and of twisting moment. It may however happen for certain aircraft that only the maximum value for the bending moment and the maximum value for the twisting moment are monitored.

Preferably, in preliminary step A/, said first safety envelope is determined with the aid of load models of the aircraft.

In a particular embodiment, in step B/a), the current bending moment Mx is determined with the aid of the following expression:

$$Mx = A1 \cdot \alpha + B1 \cdot \delta qd + C1 \cdot \delta qg + D1 \cdot ih + E1 \cdot nz \cdot X + F1 \cdot nz + G1 \cdot q^2 + H1 \cdot dq/dt + I1$$

in which:

A1, B1, C1, D1, E1, F1, G1, H1 and I1 are coefficients;

$\alpha$ is the angle of incidence of the aircraft, at the level of the tailplane;

δqd and δqg are the angles of swing of elevators, right and left, of the aircraft;

ih represents the angle of deflection of the tailplane, defined with respect to the axis of the fuselage of the aircraft;

nz is the vertical load factor, measured at the center of gravity of the aircraft;

X represents the sum of the mass of the tailplane and of the mass of fuel;

q is the pitch rate;

dq/dt represents the pitch acceleration corresponding to the derivative with respect to time t of the pitch rate q.

In this case, advantageously, said coefficients A1, B1, C1, D1, E1, F1, G1, H1 and I1 depend on the dynamic pressure, on the mass distribution (quantity of fuel, number of passengers, etc.), on the Mach number of the aircraft and on longitudinal aerodynamic characteristics of the aircraft.

In a simplified embodiment, said coefficients G1 and H1 are zero. These coefficients G1 and H1 may in fact be neglected, and they are used only when a refined calculation of the current bending moment Mx is desired.

Furthermore, in a preferred embodiment, in step B/b), the current twisting moment My is determined with the aid of the following expression:

$$My = A2 \cdot \alpha + B2 \cdot \delta qd + C2 \cdot \delta qg + D2 \cdot ih + E2 \cdot nz \cdot X + F2 \cdot nz + G2 \cdot q^2 + H2 \cdot dq/dt + I2$$

in which, in addition to the aforesaid parameters, A2, B2, C2, D2, E2, F2, G2, H2 and I2 are coefficients.

Advantageously, said coefficients A2, B2, C2, D2, E2, F2, G2, H2 and I2 likewise depend on the dynamic pressure, on the mass distribution (quantity of fuel, number of passengers, etc.), on the Mach number of the aircraft and on longitudinal aerodynamic characteristics of the aircraft.

In a simplified embodiment, said coefficients G2 and H2 are zero. These coefficients G2 and H2 may in fact be neglected, and they are used only when a refined calculation of the current twisting moment My is desired.

Furthermore, advantageously, we determine:

the angles δqd and δqg, on the basis of corresponding deflection orders;

the vertical load factor nz and the pitch rate q, on the basis of appropriate measurements;

the other abovementioned parameters used, such as ih, q, etc., likewise on the basis of appropriate measurements.

Moreover, in a particular embodiment:

in preliminary step A/, a second safety envelope is moreover determined representing a chart formed in a plane on the basis of pairs of values of twisting moment and of shearing stress of the tailplane and defined so that, for any pair of such values which lies outside said second safety envelope and which is applied to the aircraft, there exists a risk of appearance of permanent deformations on the tailplane; and in the course of the flight of the aircraft, the following steps are carried out automatically:

a current shearing stress is estimated;

a second comparison is carried out by comparing the pair formed by said current twisting moment and said current shearing stress with said second safety envelope; and in step d), one determines whether a structural inspection of said tailplane has to be performed, likewise on the basis of the result of said second comparison.

The latter embodiment makes it possible in particular to confirm an inspection, requested following the detection of an overstepping of loads with the aid of said first safety envelope (monitoring of the bending and twisting moments). In such a case, the latter embodiment is implemented, preferably, only when the first aforesaid comparison concludes that an overstepping of loads has occurred. Naturally, it may however also be implemented (continuously) in parallel with the joint monitoring of the bending moment and of the twisting moment.

Advantageously, said current shearing stress Tz is determined with the aid of the following expression:

$$Tz = A3 \cdot \alpha + B3 \cdot \delta qd + C3 \cdot \delta qg + D3 \cdot ih + E3 \cdot nz \cdot X + F3 \cdot nz + G3 \cdot q^2 + H3 \cdot dq/dt + I3$$

in which, in addition to the aforesaid parameters, A3 to I3 are coefficients.

The present invention also relates to a device for detecting an overstepping of design loads of a tailplane of an aircraft.

According to the invention, said device is noteworthy in that it comprises:

a set of information sources;

first means for determining, with the aid of information emanating from said set of information sources, a current bending moment;

second means for determining, with the aid of information emanating from said set of information sources, a current twisting moment;

third means for carrying out a first comparison, by comparing the pair formed by said current bending moment and said current twisting moment with a first safety envelope representing a chart formed in a plane on the basis of pairs of values of bending moment and of twisting moment of the tailplane and defined so that, for any pair of such values which lies outside said first safety envelope and which is applied to the aircraft, there exists a risk of appearance of permanent deformations on the tailplane; and fourth means for determining whether a structural inspection of said tailplane has to be performed, at least on the basis of said first comparison.

In a particular embodiment:

said device furthermore comprises:

fifth means for determining, with the aid of information emanating from said set of information sources, a current shearing stress; and sixth means for carrying out a second comparison, by comparing the pair formed by said current twisting moment and said current shearing stress with a second safety envelope; and said fourth means determine whether a structural inspection of said tailplane has to be performed, likewise on the basis of the result of said second comparison.

Furthermore, advantageously, the device in accordance with the invention moreover comprises seventh means intended to indicate to an operator, as appropriate, that an inspection of the tailplane has to be performed.

BRIEF DESCRIPTION OF THE DRAWING

The single FIGURE of the appended drawing will elucidate the manner in which the invention may be embodied. This FIGURE is the schematic diagram of a device in accordance with the invention.

DETAILED DESCRIPTION OF THE INVENTION

Figure 1:
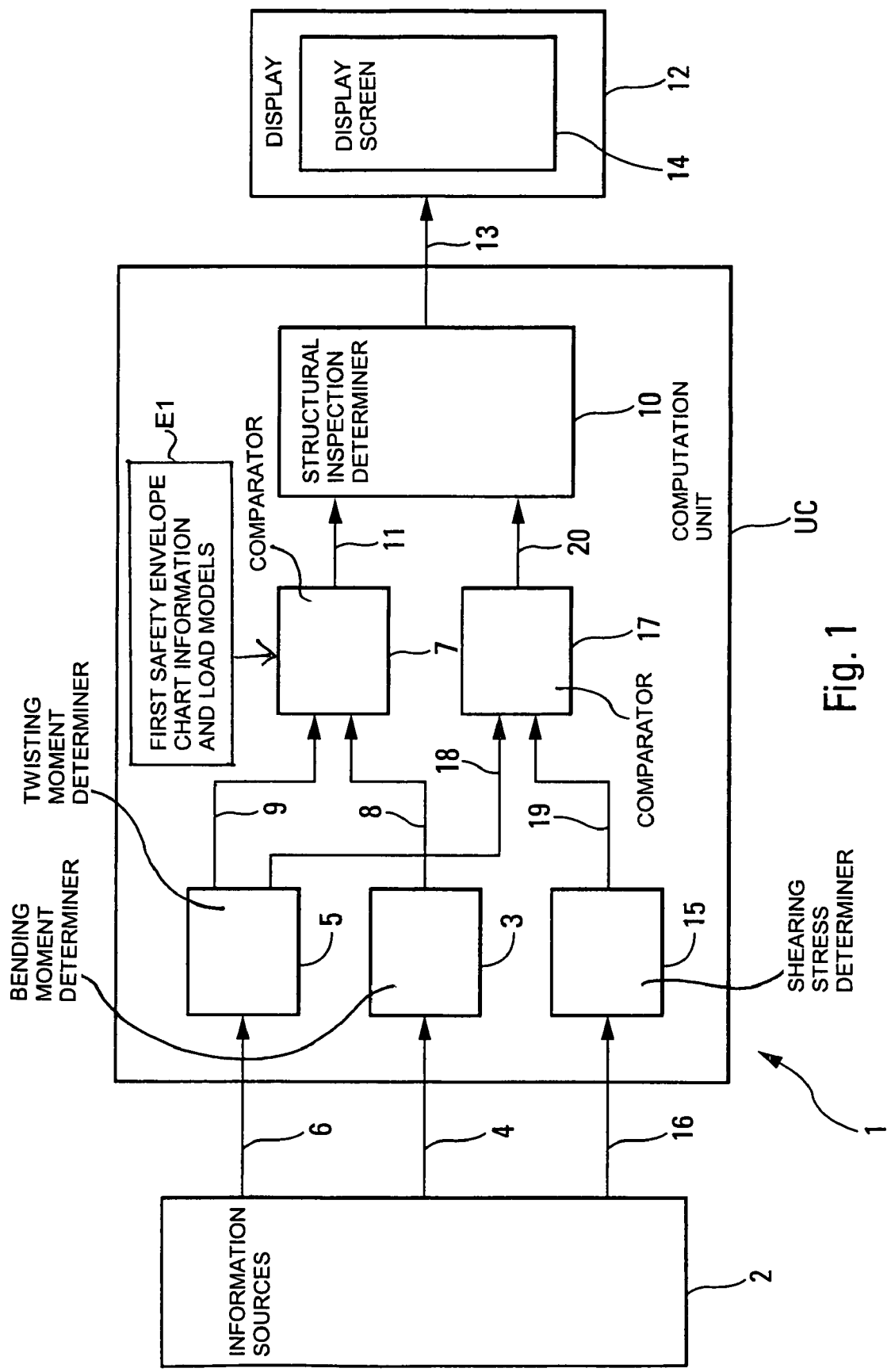

The device 1 in accordance with the invention and represented diagrammatically in FIG. 1 is intended to detect on an aircraft (not represented), in particular a transport plane, an overstepping of design loads of the tailplane.

For this purpose, said device 1 comprises, according to the invention:

a set 2 of information sources, specified hereinbelow;

means 3 which are connected by a link 4 to the set 2 of information sources, to determine in the course of a flight of the aircraft a current bending moment Mx;

means 5 which are connected by a link 6 to the set 2 of information sources, to determine in the course of the flight of the aircraft a current twisting moment My;

means 7 which are connected by links 8 and 9 respectively to said means 3 and 5, to carry out a comparison, namely to compare the pair C1 formed by said current bending moment Mx and said current twisting moment My with a first safety envelope E1 is determined on the ground, for example during mission preparation;

represents a chart formed in a plane on the basis of pairs of values of bending moment and of twisting moment of the tailplane;

is defined so that, for any pair (of such values of bending moment and of twisting moment) which lies outside said first safety envelope E1 and which is applied to the aircraft, there exists a risk of appearance of permanent deformations on the tailplane;

is determined with the aid of standard load models of the aircraft; and is, for example, recorded in said means 7; and means 10 which are connected by a link 11 to said means 7, to determine whether a structural inspection of said tailplane has to be performed, at least on the basis of the result of the comparison carried out by said means 7.

Said means 3, 5, 7 and 10 which are for example grouped into a computation unit UC implement the aforesaid computations automatically and repetitively, in the course of a flight of the aircraft.

In a preferred embodiment, said means 3 determine said current bending moment Mx, with the aid of the following expression:

$$Mx = A1 \cdot \alpha + B1 \cdot \delta qd + C1 \cdot \delta qg + D1 \cdot ih + E1 \cdot nz \cdot X + F1 \cdot nz + G1 \cdot q^2 + H1 \cdot dq/dt + I1$$

in which:

A1, B1, C1, D1, E1, F1, G1, H1 and I1 are coefficients;

$\alpha$ is the angle of incidence of the aircraft, at the level of the tailplane;

$\delta qd$ and $\delta qg$ are the angles of swing of elevators, right and left, of the aircraft;

ih represents the angle of deflection of the tailplane, defined with respect to the axis of the fuselage of the aircraft;

nz is the vertical load factor, measured at the center of gravity of the aircraft;

X represents the sum of the mass of the tailplane and of the mass of fuel;

q is the pitch rate;

dq/dt represents the pitch acceleration corresponding to the derivative with respect to time t of the pitch rate q.

Said coefficients A1, B1, C1, D1, E1, F1, G1, H1 and I1 depend on the dynamic pressure, on the mass distribution (quantity of fuel, number of passengers, etc.), on the Mach number of the aircraft and on longitudinal aerodynamic characteristics (effectiveness of control surface, effect of nonlinearity, coupling of tailplane and fin, etc.) of the aircraft. These coefficients may be recorded, for example in the form of tables, in said means 3.

In a simplified embodiment, said coefficients G1 and H1 are zero. These coefficients G1 and H1 may in fact be neglected. Preferably, they are used only when a refined calculation of the current bending moment Mx is desired.

Moreover, by virtue of said set 2 of information sources, we determine:

the angles $\delta qd$ and $\delta qg$, on the basis of corresponding deflection orders;

the vertical load factor-nz and the pitch rate q, on the basis of appropriate measurements;

the other abovementioned parameters used, such as ih, q, etc., likewise on the basis of appropriate measurements.

Moreover, said means 5 determine the current twisting moment My with the aid of the following expression:

$$My = A2 \cdot \alpha + B2 \cdot \delta qd + C2 \cdot \delta qg + D2 \cdot ih + E2 \cdot nz \cdot X + F2 \cdot nz + G2 \cdot q^2 + H2 \cdot dq/dt + I2$$

in which A2, B2, C2, D2, E2, F2, G2, H2 and I2 are coefficients.

Just like the coefficients A1 to I1, said coefficients A2 to I2 depend on the dynamic pressure, on the mass distribution (quantity of fuel, number of passengers, etc.), on the Mach number of the aircraft and on longitudinal aerodynamic characteristics (effectiveness of control surface, effect of nonlinearity, coupling of tailplane and fin, etc.) of the aircraft.

In a simplified embodiment, the coefficients G2 and H2 are zero. These coefficients G2 and H2 may in fact be neglected, and they are used only when a refined calculation of the current bending moment My is desired.

Thus, by virtue of the simultaneously monitoring of the bending moment Mx and of the twisting moment My of the tailplane (by way of said first safety envelope E1), which is implemented by the device 1 in accordance with the invention, a refined evaluation of the load level to which said tailplane has been subjected is obtained.

This makes it possible to significantly reduce the number of inspections (or maintenance checks) to be triggered relating to said tailplane and hence the drawbacks stemming therefrom.

Moreover, by virtue of the taking into account of said safety envelope E1:

the monitoring is particularly effective and simplified, since said first safety envelope E1 is formed on the ground before the flight; and the evaluation of a possible overstepping of loads is very refined, since one does not in general simply take into account a single maximum value for the bending moment and a single maximum value for the twisting moment, but a high number of pairs of bending moment and of twisting moment (which define said first safety envelope E1).

The device 1 in accordance with the invention also comprises means 12 which are connected by a link 13 to said means 10 and which are intended to indicate to an operator, for example a maintenance operator or a pilot of the aircraft, as appropriate, that an inspection of the tailplane has to be performed. These means 12 may in particular comprise means of display making it possible to display on a display screen 14 the aforesaid indications. They may also comprise means of printing and/or means of alarm, for example, of audible type and/or of visual type, which are in particular mounted in the flight control deck of the aircraft.

It will be noted that such an alarm may be recorded in a maintenance logger, so that the maintenance teams are aware of the progress of the flight and know which maintenance operation(s) they have to perform. Moreover, it is possible to prewarn the maintenance teams in advance so that they are ready to intervene as soon as the aircraft lands.

Additionally, in a particular embodiment:

said device 1 moreover comprises:

means 15 which are connected by a link 16 to said set 2 of information sources, to determine a current shearing stress Tz; and means 17 which are connected by links 18 and 19 respectively to said means 5 and 15, to carry out a comparison, namely to compare the pair C2 formed by said current twisting moment My and said current shearing stress Tz with a second safety envelope E2. This second safety envelope E2 (not represented):

is likewise determined on the ground, for example during mission preparation;

represents a chart formed in a plane on the basis of pairs of values of twisting moment and of shearing stress of the tailplane;

is defined so that, for any pair (of such values of twisting moment and of shearing stress) which lies outside said second safety envelope E2 and which is applied to the aircraft, there exists a risk of appearance of permanent deformation on the tailplane;

is determined with the aid of standard load models of the aircraft; and is, for example, recorded in said means 17; and said means 10 which are connected by a link 20 to said means 17, determine whether a structural inspection of said tailplane has to be performed, likewise on the basis of the result of the comparison carried out by said means 17.

In a particular embodiment, said means 15 determine said current shearing stress Tz with the aid of the following expression:

$$Tz = A3 \cdot \alpha + B3 \cdot \delta qd + C3 \cdot \delta qg + D3 \cdot ih + E3 \cdot nz \cdot X + F3 \cdot nz + G3 \cdot q^2 + H3 \cdot dq/dt + I3$$

in which A3, B3, C3, D3, E3, F3, G3, H3 and I3 are coefficients.

Just like the coefficients A1 to I1, said coefficients A3 to I3 depend on the dynamic pressure, on the mass distribution (quantity of fuel, number of passengers, etc.), on the Mach number of the aircraft and on longitudinal aerodynamic characteristics (effectiveness of control surface, effect of nonlinearity, coupling of tailplane and fin, etc.) of the aircraft.

In a simplified embodiment, the coefficients G3 and H3 are zero. These coefficients G3 and H3 may in fact be neglected. Preferably, they are used only when a refined calculation of the current shearing stress Tz is desired.

The latter embodiment makes it possible in particular to confirm an inspection, requested following the detection of an overstepping of loads with the aid of said first safety envelope E1 (bending and twisting moments). In such a case, the latter embodiment is implemented, preferably, only when the comparison implemented by the means 17 concludes that an overstepping of loads has occurred. Naturally, the latter embodiment may however also be implemented in parallel with the joint monitoring of the bending moment Mx and of the twisting moment My.

The invention claimed is:

1. A method for detecting an overstepping of design loads of the tailplane of an aircraft, said method comprising:

A/ determining, in a preliminary step, a first safety envelope representing a chart formed in a plane on the basis of pairs of values of bending moment and of twisting moment of the tailplane and defined so that, for any pair of such values which lies outside said first safety envelope and which is applied to the aircraft, there exists a risk of permanent deformations developing on the tailplane;

B/ carrying out, in the course of a flight of the aircraft, the following steps repetitively and automatically:

a) estimating the current bending moment;

b) estimating the current twisting moment;

c) carrying out a first comparison by comparing said current bending moment and said current twisting moment with said first safety envelope; and d) determining whether a structural inspection of said tailplane has to be performed, at least on the basis of the result of said first comparison.

2. The method as claimed in claim 1, wherein in step d), an alarm is emitted in the flight control deck of the aircraft, if a structural inspection of said tailplane has to be performed.

3. The method as claimed in claim 1, wherein in preliminary step A/, said first safety envelope is determined with the aid of load models of the aircraft.

4. The method as claimed in claim 1, wherein in step B/a), said current bending moment Mx is determined with the aid of the following expression:

$$Mx = A1 \cdot \alpha + B1 \cdot \delta qd + C1 \cdot \delta qg + D1 \cdot ih + E1 \cdot nz \cdot X + F1 \cdot nz + G1 \cdot q^2 + H1 \cdot dq/dt + I1 \text{ in which:}$$

A1, B1, C1, D1, E1, F1, G1, H1 and I1 are coefficients;

$\alpha$ is the angle of incidence of the aircraft, at the level of the tailplane;

$\delta qd$ and $\delta qg$ are the angles of swing of elevators, right and left, of the aircraft;

ih represents the angle of deflection of the tailplane, defined with respect to the axis of the fuselage of the aircraft;

nz is the vertical load factor, measured at the center of gravity of the aircraft;

X represents the sum of the mass of the tailplane and of the mass of fuel;

q is the pitch rate;

dq/dt represents the pitch acceleration corresponding to the derivative with respect to time t of the pitch rate q.

5. The method as claimed in claim 4, wherein said coefficients A1, B1, C1, D1, E1, F1, G1, H1 and I1 depend on the dynamic pressure, on the mass distribution, on the Mach number of the aircraft and on longitudinal aerodynamic characteristics of the aircraft.

6. The method as claimed in claim 4, wherein said coefficients G1 and H1 are zero.

7. The method as claimed in claim 1, wherein in step B/b), said current twisting moment My is determined with the aid of the following expression:

$$My = A2 \cdot \alpha + B2 \cdot \delta qd + C2 \cdot \delta qg + D2 \cdot ih + E2 \cdot nz \cdot X + F2 \cdot nz + G2 \cdot q^2 + H2 \cdot dq/dt + I2 \text{ in which:}$$

A2, B2, C2, D2, E2, F2, G2, H2 and I2 are coefficients;

$\alpha$ is the angle of incidence of the aircraft, at the level of the tailplane;

δqd and δqg are the angles of swing of elevators, right and left, of the aircraft;

ih represents the angle of deflection of the tailplane, defined with respect to the axis of the fuselage of the aircraft;

nz is the vertical load factor, measured at the center of gravity of the aircraft;

X represents the sum of the mass of the tailplane and of the mass of fuel;

q is the pitch rate;

dq/dt represents the pitch acceleration corresponding to the derivative with respect to time t of the pitch rate q.

8. The method as claimed in claim 7, wherein said coefficients A2, B2, C2, D2, E2, F2, G2, H2 and I2 depend on the dynamic pressure, on the mass distribution, on the Mach number of the aircraft and on longitudinal aerodynamic characteristics of the aircraft.

9. The method as claimed in claim 7, wherein said coefficients G2 and H2 are zero.

10. The method as claimed in claim 1, further comprising:

determining, in preliminary step A/, a second safety envelope representing a chart formed in a plane on the basis of pairs of values of twisting moment and of shearing stress of the tailplane and defined so that, for any pair of such values which lies outside said second safety envelope and which is applied to the aircraft, there exists a risk of permanent deformations developing on the tailplane; and carrying out, in the course of the flight of the aircraft, the following steps automatically:

estimating a current shearing stress;

carrying out a second comparison by comparing said current twisting moment and said current shearing stress with said second safety envelope; and in step d), determining whether a structural inspection of said tailplane has to be performed, likewise on the basis of the result of said second comparison.

11. The method as claimed in claim 10, wherein said current shearing stress Tz is determined with the aid of the following expression:

$Tz = A3 \cdot \alpha + B3 \cdot \delta qd + C3 \cdot \delta qg + D3 \cdot ih + E3 \cdot nz \cdot X + F3 \cdot nz + G3 \cdot q^2 + H3 \cdot dq/dt + I3$ in which:

A3, B3, C3, D3, E3, F3, G3, H3 and I3 are coefficients;

$\alpha$ is the angle of incidence of the aircraft, at the level of the tailplane;

δqd and δqg are the angles of swing of elevators, right and left, of the aircraft;

ih represents the angle of deflection of the tailplane, defined with respect to the axis of the fuselage of the aircraft;

nz is the vertical load factor, measured at the center of gravity of the aircraft;

X represents the sum of the mass of the tailplane and of the mass of fuel;

q is the pitch rate;

dq/dt represents the pitch acceleration corresponding to the derivative with respect to time t of the pitch rate q.

12. A device for detecting an overstepping of design loads of a tailplane of an aircraft, which device comprises:

a set of information sources;

a first section for determining, with the aid of information emanating from said set of information sources, a current bending moment;

a second section for determining, with the aid of information emanating from said set of information sources, a current twisting moment;

a third section for carrying out a first comparison, by comparing said current bending moment and said current twisting moment with a first safety envelope representing a chart formed in a plane on the basis of pairs of values of bending moment and of twisting moment of the tailplane and defined so that, for any pair of such values which lies outside said first safety envelope and which is applied to the aircraft, there exists a risk of permanent deformations developing on the tailplane; and a fourth section for determining whether a structural inspection of said tailplane has to be performed, at least on the basis of said first comparison.

13. The device as claimed in claim 12, wherein:

said device furthermore comprises:

a fifth section for determining, with the aid of information emanating from said set of information sources, a current shearing stress; and a sixth section for carrying out a second comparison, by comparing said current twisting moment and said current shearing stress with a second safety envelope; and said fourth section determines whether a structural inspection of said tailplane has to be performed, likewise on the basis of the result of said second comparison.

14. The device as claimed in claim 12, which furthermore comprises a seventh section intended to indicate to an operator, as appropriate, that an inspection of the tailplane has to be performed.

* * * * *